(12) United States Patent
Musa (10) Patent No.: US 11,514,588 B1
(45) Date of Patent: Nov. 29, 2022

(54) OBJECT LOCALIZATION FOR MAPPING APPLICATIONS USING GEOMETRIC COMPUTER VISION TECHNIQUES

(71) Applicant: Amazon Technologies, Inc., Seattle, WA (US)

(72) Inventor: Abm Musa, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 104 days.

(21) Appl. No.: 16/934,591

(22) Filed: Jul. 21, 2020

(51) Int. Cl.
| | | |
|---|---|---|
| *G06T 7/246* | (2017.01) | |
| *G06T 7/73* | (2017.01) | |
| *G06T 7/215* | (2017.01) | |
| *G01S 19/01* | (2010.01) | |
| *G01C 11/00* | (2006.01) | |
| *G06T 7/269* | (2017.01) | |

(52) U.S. Cl.
CPC ............. *G06T 7/246* (2017.01); *G01C 11/00* (2013.01); *G01S 19/01* (2013.01); *G06T 7/215* (2017.01); *G06T 7/269* (2017.01); *G06T 7/73* (2017.01); *G06T 2207/30244* (2013.01); *G06T 2207/30252* (2013.01)

(58) Field of Classification Search
CPC . G06T 2207/10016; G06T 2207/10024; G06T 2207/20056; G06T 2207/20081; G06T 2207/30232; G06T 2207/30244; G06T 2207/30252; G06T 7/11; G06T 7/215; G06T 7/13; G06T 7/194; G06T 7/70; G06T 7/90; G06T 7/00; G06T 17/20; G06T 2200/04; G01C 11/00; G01S 19/01; G06K 9/6227; G06V 10/60; G06V 10/96; G06V 20/44; G06V 20/52; G06V 20/56; G06V 20/64; G06V 30/10; G06V 40/16
See application file for complete search history.

(56) References Cited

U.S. PATENT DOCUMENTS

| | | | |
|---|---|---|---|
| 2014/0270484 A1* | 9/2014 | Chandraker | G06T 7/73 382/154 |
| 2016/0140400 A1* | 5/2016 | Chandraker | G06V 20/693 348/149 |
| 2017/0186169 A1* | 6/2017 | Viswanath | G06V 10/44 |
| 2017/0314930 A1* | 11/2017 | Monterroza | G06T 7/73 |
| 2017/0322560 A1* | 11/2017 | Zhang | G06V 20/58 |
| 2019/0080462 A1* | 3/2019 | Jung | H04N 13/261 |
| 2019/0205694 A1* | 7/2019 | Wang | G06V 10/32 |
| 2019/0258251 A1* | 8/2019 | Ditty | G06F 15/7807 |
| 2019/0378283 A1* | 12/2019 | Boult | G06T 7/215 |
| 2020/0218913 A1* | 7/2020 | Unnikrishnan | G01S 13/867 |
| 2020/0327646 A1* | 10/2020 | Xu | G06T 5/20 |
| 2021/0342589 A1* | 11/2021 | Chawla | G06F 16/587 |

* cited by examiner

*Primary Examiner* — Ian L Lemieux
(74) *Attorney, Agent, or Firm* — Athorus, PLLC (57) ABSTRACT

Systems and methods to localize objects for mapping applications may comprise a vehicle having an imaging device, a location sensor, and an edge processor. Using imaging data from the imaging device, location data from the location sensor, and bounding box data associated with objects, three-dimensional models of environments may be reconstructed using structure from motion algorithms and/or direct triangulation algorithms. After aligning the reconstructions to real-world environments based on the location data, objects may be accurately localized relative to real-world environments.

19 Claims, 6 Drawing Sheets

OBJECT LOCALIZATION FOR MAPPING APPLICATIONS USING GEOMETRIC COMPUTER VISION TECHNIQUES

BACKGROUND

Various systems and methods may be used to generate accurate localization data for mapping applications based on imaging data, radar data, light detection and ranging (LIDAR) data, and other types of data. For example, structure from motion algorithms may reconstruct three-dimensional environments based on combinations of such data. However, structure from motion algorithms may be expensive, slow, and computationally intensive, generally requiring remote servers. Accordingly, there is a need for systems and methods to quickly generate localization data associated with objects in an environment that are less expensive, faster, and less computationally intensive, which may facilitate real-time processing and generation of localization data by onboard, edge processors.

DETAILED DESCRIPTION

As is set forth in greater detail below, implementations of the present disclosure are directed to systems and methods to localize objects, such as traffic signs, traffic lights, street signs, building or house numbers, or other objects, for mapping applications.

In example embodiments, an object may be localized using a combination of the systems and methods described herein. For example, a three-dimensional model of an environment may be reconstructed from a sequence of images using a structure from motion algorithm. However, structure from motion algorithms may generally be expensive, slow, and computationally intensive, such that the reconstruction of a three-dimensional model of an environment may need to be performed by a remote server or other processor that is separate from an edge processor, such as a processor onboard a vehicle.

In additional example embodiments, a three-dimensional model of an environment may be reconstructed from a sequence of images using geometric computer vision algorithms as described herein. Such geometric computer vision algorithms may generally be less expensive, faster, and less computationally intensive, such that the reconstruction of a three-dimensional model of an environment may be performed by an edge processor, such as a processor onboard a vehicle. For example, using the sequence of images and a bounding box associated with an object to be localized, such as a traffic sign, traffic light, street sign, building or house number, or other object, a plurality of points associated with the object may be identified and tracked within the sequence of images. The plurality of points may be associated with the bounding box itself, may be associated with other portions of the bounding box, such as surfaces or features within the bounding box, and/or may be associated with corners or features within the environment and external to the bounding box. In addition, the bounding box and/or the plurality of points may be tracked using various algorithms, such as object tracking and feature matching algorithms and/or optical flow algorithms.

Further, based on the identified and tracked points within the sequence of images, the camera pose for individual images may be estimated. Then, the position and orientation of the camera, as well as the position of tracked points, may be triangulated based on multiple images of the sequence of images. In addition, the tracked points may be bundled and adjusted based on the determined imaging device positions and orientations and the multiple images of the sequence of images.

In further example embodiments, based on the reconstructions of the three-dimensional model of the environment, e.g., using structure from motion algorithms or using geometric computer vision algorithms, the three-dimensional model may be aligned, scaled, and oriented with actual location data, e.g., global positioning system (GPS) data, associated with individual images of the sequence of images. In addition, the bounding box associated with the object may be correlated with corresponding points of the three-dimensional model. For example, a cluster of latitude and longitude coordinates of the bounding box associated with the object may be computed based on multiple images of the sequence of images. Furthermore, an actual location of the object may be determined based on a combination of the cluster of latitude and longitude coordinates of the bounding box associated with the object.

In this manner, one or more objects within an environment, such as traffic signs, traffic lights, street signs, building or house numbers, or other objects, may be localized at actual locations within the environment using a combination of structure from motion algorithms and/or geometric computer vision algorithms. In addition, the geometric computer vision algorithms may enable less expensive and faster reconstruction of a three-dimensional model of an environment by an edge processor, such as a processor onboard a vehicle, such that objects may be localized within an environment substantially in real-time without need for processing by one or more remote servers or other processors.

Figure 1:
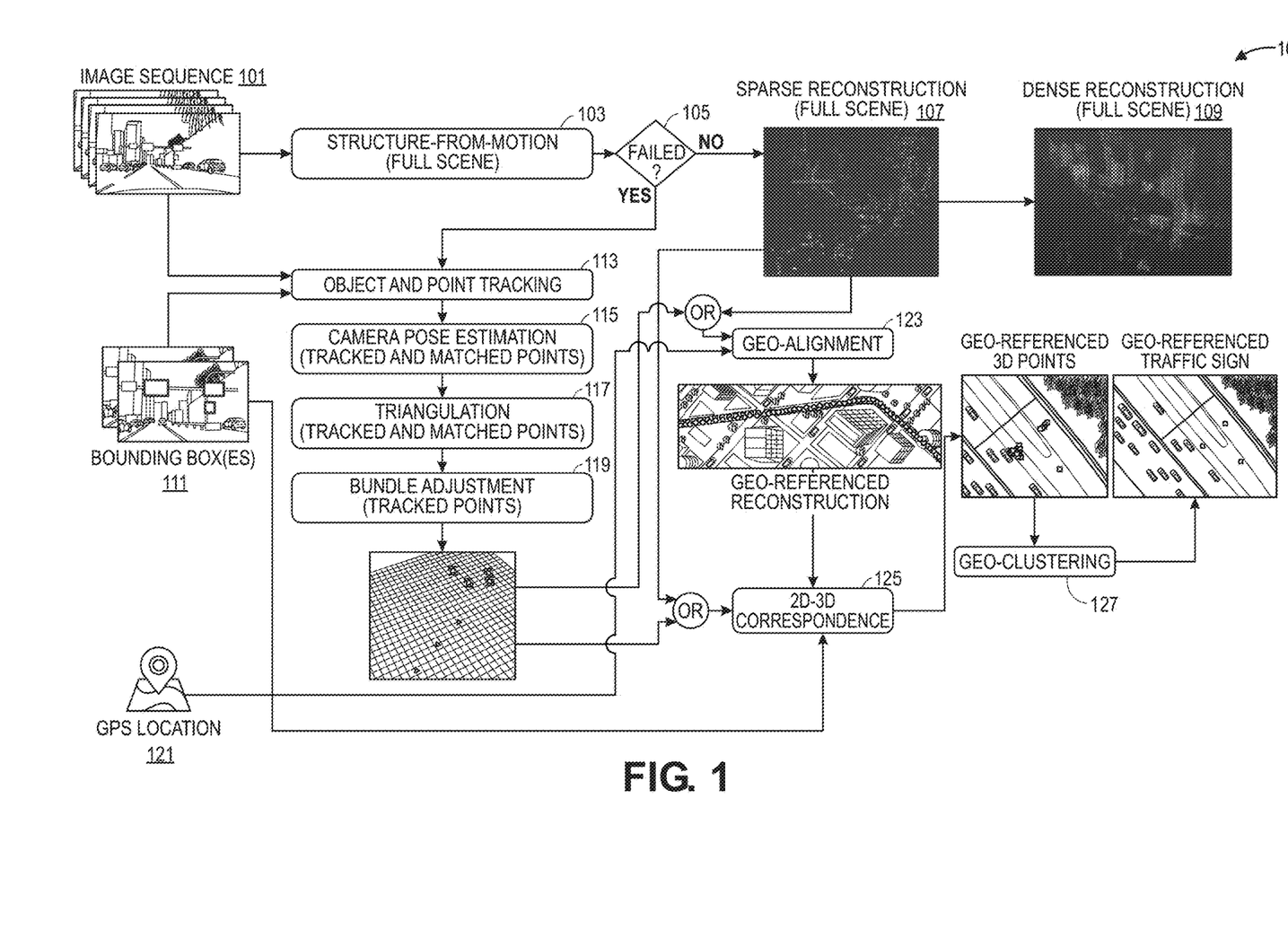
FIG. 1 is a schematic architecture diagram of an example object localization system and method, in accordance with implementations of the present disclosure.

FIG. 1 is a schematic architecture diagram 100 of an example object localization system and method, in accordance with implementations of the present disclosure.

As shown in FIG. 1, an image sequence 101 may be captured by an imaging device onboard a vehicle. The imaging device may comprise a monocular imaging device. In other example embodiments, the imaging device may comprise stereo imaging devices, an imaging device having a depth sensor, and/or other types of imaging devices. In further example embodiments, the vehicle may also include a radar sensor, a light detection and ranging (LIDAR) sensor, and/or other types of sensors. The imaging device may capture the image sequence 101 having a plurality of images during navigation, operation, or movement of the vehicle within an environment, e.g., during travel along one or more streets or roads within a town, city, county, region, etc.

The vehicle may also include an onboard processor, which may be referred to as an edge processor herein, as well as one or more location sensors, such as a GPS sensor or GNSS sensor. Further, the imaging device and the location sensor may have accurate time synchronization therebetween, such that imaging data captured by the imaging device may be correlated accurately in time with location data captured by the location sensor.

In example embodiments, the image sequence 101 may be provided, transmitted, or sent to a remote server or other processor that is separate from the vehicle having the imaging device. At the remote server, a structure from motion algorithm 103 may receive and process the image sequence 101 to reconstruct a three-dimensional model of the environment captured within the image sequence 101.

Generally, a structure from motion algorithm 103 may reconstruct a three-dimensional model of an environment to provide relative locations of objects within the image sequence and to provide full spatial context of the environment. In example embodiments, a structure from motion algorithm may include feature extraction from individual images of the image sequence, feature matching among multiple images of the image sequence, camera pose determinations and track computation based on the tracked features and image sequence, triangulation of the camera pose determinations and tracked features, and bundle adjustment of the camera pose determinations and tracked features. In some example embodiments, a structure from motion algorithm may utilize scale invariant feature transform (SIFT), speeded-up robust features (SURF), and/or other techniques to enable feature extraction and/or feature matching among images of the image sequence. In further example embodiments, a structure from motion algorithm may generate a three-dimensional point cloud of the environment utilizing various multiview stereo (MVS) matching processes or techniques, and/or other techniques.

Structure from motion algorithms may fail due to various reasons or factors. Accordingly, it may be determined whether the structure from motion algorithm has failed, as at 105 shown in FIG. 1. For example, a structure from motion algorithm may fail to reconstruct a three-dimensional model of an environment, or may reconstruct a three-dimensional model of an environment with insufficient quality, from an image sequence due to poor image quality, blockage or occlusion of the imaging device, blockage or occlusion of portions of the environment by one or more objects, environmental factors such as rain, precipitation, fog, dust, or other aspects related to weather or visibility, repetitive features or textures within the environment, issues or problems associated with the imaging device such as light reflections, exposure issues, resolution issues, focus problems, or others, errors or problems associated with aspects of the structure from motion algorithm such as triangulation or bundle adjustment filtering, and/or various other reasons or factors. As is generally known in the art, the determination of whether a structure from motion algorithm has failed may be determined in various ways, such as using various matrices including feature count, matching inliers, reprojection errors, bundle adjustment convergences, and/or trajectory deviations between GPS data and estimated locations from structure from motion algorithms.

If the structure from motion algorithm has not failed, then a sparse reconstruction 107 of a three-dimensional model of the environment may be generated based at least in part on the three-dimensional point cloud of the environment. However, the sparse reconstruction of the three-dimensional model may have arbitrary scale and orientation relative to a real-world scale and orientation of the environment.

As further described herein, the sparse reconstruction 107 of the three-dimensional model may then be aligned, scaled, and oriented with actual location data, e.g., GPS data, associated with individual images of the image sequence, as at geo-alignment 123 shown in FIG. 1. In addition, a bounding box associated with an object may be correlated with corresponding points of the three-dimensional model. For example, a cluster of latitude and longitude coordinates of the bounding box associated with the object may be computed based on multiple images of the image sequence, as at 2D-3D correspondence 125 shown in FIG. 1. Furthermore, an actual location of the object may be determined based on a combination of the cluster of latitude and longitude coordinates of the bounding box associated with the object, as at geo-clustering 127 shown in FIG. 1.

In additional example embodiments, a dense reconstruction 109 of the three-dimensional model of the environment may also be generated based at least in part on the three-dimensional point cloud of the environment and additional imaging data, depth data, and/or other sensor data associated with individual points of the three-dimensional point cloud. The dense reconstruction 109 of the three-dimensional model may be used for visualization and/or debugging of the environment, e.g., using one or more manual or automated processes or techniques.

If, however, the structure from motion algorithm has failed due to one or more of the various reasons or factors described herein, a three-dimensional model of the environment may alternatively be reconstructed using geometric computer vision algorithms or techniques, which may also be referred to herein as direct triangulation algorithms or techniques. The direct triangulation algorithms or techniques described herein may not require feature extraction and feature matching processes similar to those utilized by structure from motion algorithms, which processes may generally be expensive, slow, and computationally intensive. Instead, the direct triangulation algorithms or techniques described herein may utilize bounding boxes of objects to be localized, e.g., one or more points associated with such bounding boxes, to enable less expensive, faster, and less computationally intensive reconstruction of a three-dimensional model of an environment.

In example embodiments of direct triangulation algorithms, as shown in FIG. 1, an image sequence 101 may be captured by an imaging device onboard a vehicle. The imaging device may comprise a monocular imaging device. In other example embodiments, the imaging device may comprise stereo imaging devices, an imaging device having a depth sensor, and/or other types of imaging devices. In further example embodiments, the vehicle may also include a radar sensor, a light detection and ranging (LIDAR) sensor, and/or other types of sensors. The imaging device may capture the image sequence 101 having a plurality of images during navigation, operation, or movement of the vehicle within an environment, e.g., during travel along one or more streets or roads within a town, city, county, region, etc.

The vehicle may also include an onboard processor, which may be referred to as an edge processor herein, as well as one or more location sensors, such as a GPS sensor or GNSS sensor. Further, the imaging device and the location sensor may have accurate time synchronization therebetween, such that imaging data captured by the imaging device may be correlated accurately in time with location data captured by the location sensor.

In example embodiments, the image sequence 101 may be provided, transmitted, or sent to the edge processor onboard the vehicle having the imaging device and the location sensor. In addition, one or more bounding boxes 111 associated with one or more objects, such as traffic signs, traffic lights, street signs, building or house numbers, or other objects, to be localized within the environment may be provided, transmitted, or sent to the edge processor. The bounding boxes 111 may be determined using various image processing algorithms or techniques, e.g., one or more manual or automated object, feature, surface, corner, edge, character, or other image processing techniques, that will not be further described herein. The edge processor may receive and process the image sequence 101 and the bounding boxes 111 to reconstruct a three-dimensional model of the environment captured within the image sequence 101.

Figure 2:
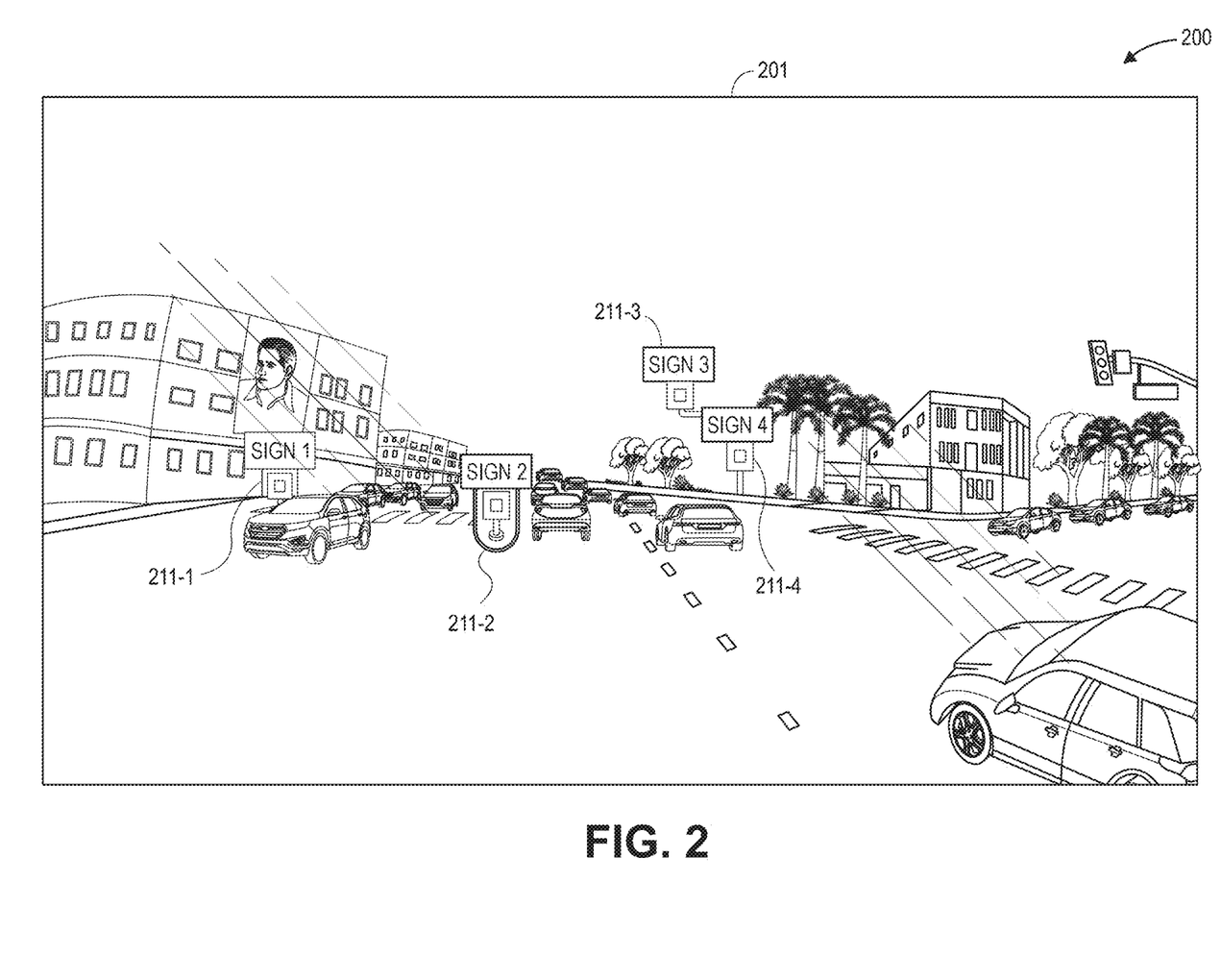
FIG. 2 is a schematic diagram of an example image with bounding boxes, in accordance with implementations of the present disclosure.

FIG. 2 is a schematic diagram 200 of an example image 201 with bounding boxes 211, in accordance with implementations of the present disclosure.

As shown in FIG. 2, an example image 201 may include one or more bounding boxes 211 associated with respective objects within the environment, in which the environment may comprise one or more streets or roads, one or more buildings or structures, one or more vehicles, and/or various other types of objects. For example, bounding box 211-1 may be associated with a first traffic sign, bounding box 211-2 may be associated with a second traffic sign, bounding box 211-3 may be associated with a third traffic sign, and bounding box 211-4 may be associated with a fourth traffic sign. In other example embodiments, other numbers of bounding boxes associated with respective objects may be identified and tracked in individual images of the image sequence.

Referring again to FIG. 1, based at least in part on the image sequence 101 and the bounding boxes 111 associated with objects to be localized, a plurality of points associated with objects may be identified and tracked within the image sequence, as at object and point tracking 113 shown in FIG. 1. Additional details related to object and point tracking are described herein at least with reference to FIG. 3.

Figure 3:
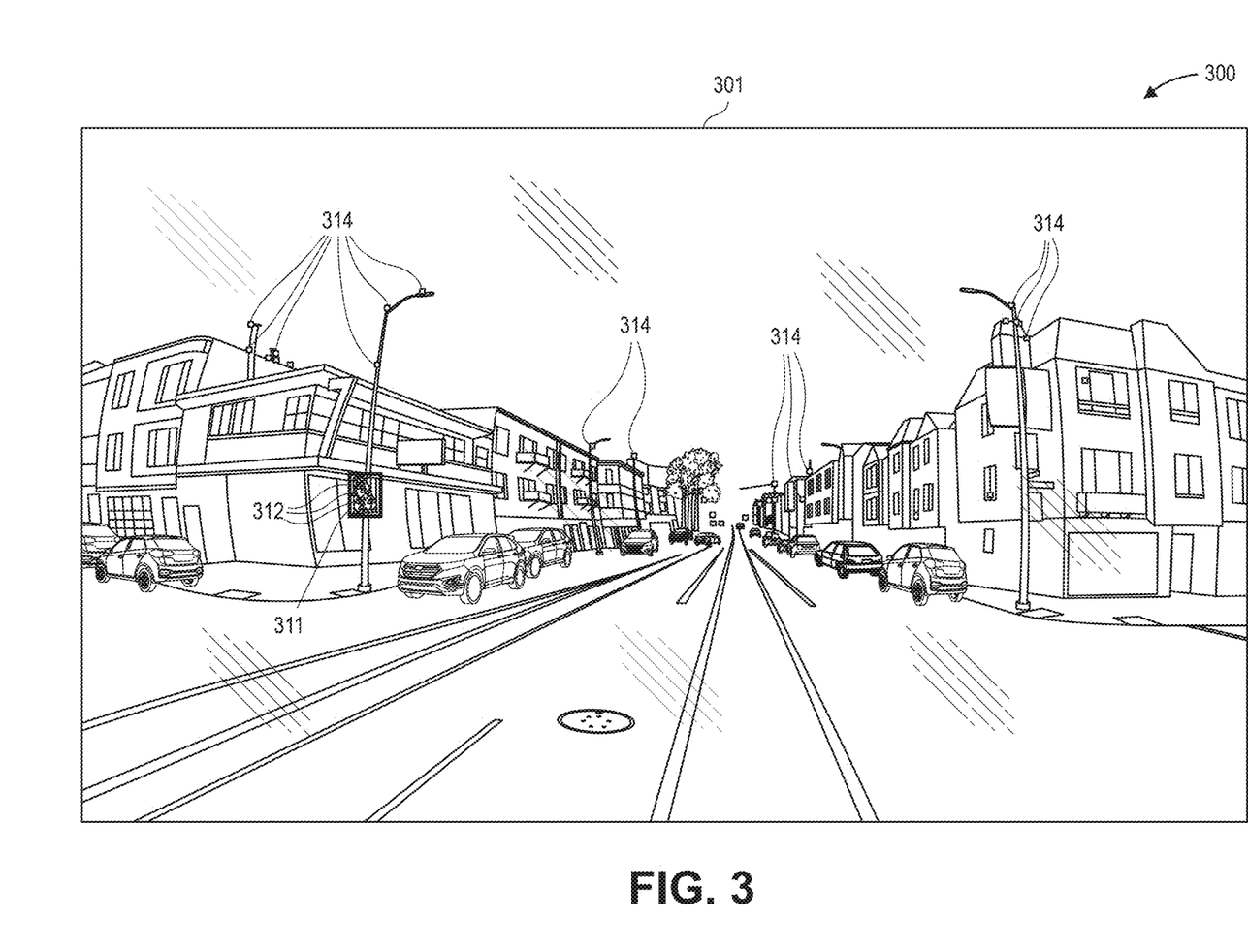
FIG. 3 is a schematic diagram of an example image with bounding boxes and tracked points, in accordance with implementations of the present disclosure.

FIG. 3 is a schematic diagram 300 of an example image 301 with bounding boxes and tracked points, in accordance with implementations of the present disclosure.

As shown in FIG. 3, an example image 301 may include one or more bounding boxes 311 associated with respective objects within the environment, in which the environment may comprise one or more streets or roads, one or more buildings or structures, one or more vehicles, and/or various other types of objects. For example, the bounding box 311 may be associated with a traffic sign. In addition, the bounding box 311 may comprise a plurality of points associated with corners, edges, or other portions around a periphery of the bounding box 311. The plurality of points associated with the bounding box 311 may be identified in individual images of the image sequence.

In additional example embodiments, a plurality of points 312 associated with surfaces, features, or other portions within or internal to the bounding box 311 may also be identified in individual images of the image sequence. In further example embodiments, a plurality of points 314 associated with features, corners, edges, surfaces, or other portions of an environment external or separate from the bounding box 311 may also be identified in individual images of the image sequence. In some examples, the plurality of points 314 may comprise a few hundred points, e.g., approximately 200 points, approximately 300 points, or other numbers of points. Various of the plurality of points associated with the bounding box 311, and/or the pluralities of points 312, 314 may be identified using various image processing algorithms or techniques, such as SIFT, oriented FAST and rotated BRIEF (ORB), KAZE, accelerated KAZE (A-KAZE), various machine learning or deep learning algorithms, and/or other techniques.

In one example embodiment, a plurality of points associated with the bounding box 311 itself may be identified and tracked in multiple images of the image sequence, e.g., corners of the bounding box and/or one or more points along edges of the bounding box. The bounding box 311, e.g., corners of the bounding box and/or one or more points along edges of the bounding box, may be tracked using object tracking and feature matching processes or techniques, such as channel and spatial reliability tracking (CSRT), kernelized correlation filter (KCF), median flow, and/or other techniques.

In another example embodiment, a plurality of points associated with the bounding box 311 itself and a plurality of points 312 within the bounding box may be identified and tracked in multiple images of the image sequence. The bounding box 311, e.g., corners of the bounding box and/or one or more points along edges of the bounding box, may be tracked using object tracking and feature matching processes or techniques, such as CSRT, KCF, median flow, and/or other techniques. In addition, the plurality of points 312 within the bounding box may be tracked using optical flow processes or techniques.

In a further example embodiment, a plurality of points associated with the bounding box 311 itself, a plurality of points 312 within the bounding box, and/or a plurality of points 314 associated with the environment external to the bounding box may be identified and tracked in multiple images of the image sequence. The bounding box 311, e.g., corners of the bounding box and/or one or more points along edges of the bounding box, may be tracked using object tracking and feature matching processes or techniques, such as CSRT, KCF, median flow, and/or other techniques. In addition, the plurality of points 312 within the bounding box and/or the plurality of points 314 external to the bounding box may be tracked using optical flow processes or techniques.

In a still further example embodiment, a plurality of points associated with the bounding box 311 itself, a plurality of points 312 within the bounding box, and/or a plurality of points 314 associated with the environment external to the bounding box may be identified and tracked in multiple images of the image sequence. The bounding box 311, e.g., corners of the bounding box and/or one or more points along edges of the bounding box, the plurality of points 312 within the bounding box, and/or the plurality of points 314 associated with the environment external to the bounding box may be tracked using optical flow processes or techniques.

Generally, object tracking and feature matching processes or techniques, such as CSRT, KCF, median flow, and/or other related techniques, may be more robust than optical flow processes or techniques. In addition, object tracking and feature matching processes or techniques may be better suited for tracking a bounding box 311, e.g., corners of the bounding box and/or one or more points along edges of the bounding box. In contrast, optical flow processes or techniques may be computationally faster than object tracking and feature matching processes or techniques. Further, optical flow processes or techniques may be better suited for tracking a plurality of points 312 within a bounding box and/or a plurality of points 314 external to a bounding box that may be spread out, dispersed, or scattered within an environment. Moreover, tracking a plurality of points that are relatively evenly spread out, dispersed, or scattered within an environment may provide better pose estimation and triangulation results using various of the described processes or techniques.

Example embodiments utilizing a combination of object tracking and feature matching processes or techniques and optical flow processes or techniques substantially simultaneously to track different respective bounding boxes and/or respective pluralities of points associated with different portions of an environment captured in multiple images of an image sequence may leverage the advantages of the different processes or techniques to enable less expensive, faster, and less computationally intensive tracking and matching of objects within an environment.

In additional example embodiments, the object and point tracking processes described herein may also include various filtering processes or techniques. For example, one or more points that are not consistently identified in multiple images of an image sequence, e.g., spurious tracked points, bad correspondences, imaging data errors, or image processing errors, may be removed, discarded, or ignored during object and point tracking. Various types of filtering processes or techniques may be used to remove erroneous tracked points or other errors, thereby improving the performance of the object and point tracking processes described herein.

Referring again to FIG. 1, based on the identified and tracked points within the image sequence, the camera pose for individual images may be estimated, as at camera pose estimation 115 shown in FIG. 1. Then, the position and orientation of the imaging device, as well as the position of tracked points, may be triangulated based on multiple images of the image sequence, as at triangulation 117 shown in FIG. 1. Further, the tracked points may be bundled and adjusted based on the determined imaging device positions and orientations and the multiple images of the image sequence, as at bundle adjustment 119 shown in FIG. 1. Additional details related to camera pose estimation, triangulation, and bundle adjustment are described herein at least with reference to FIG. 4.

Figure 4:
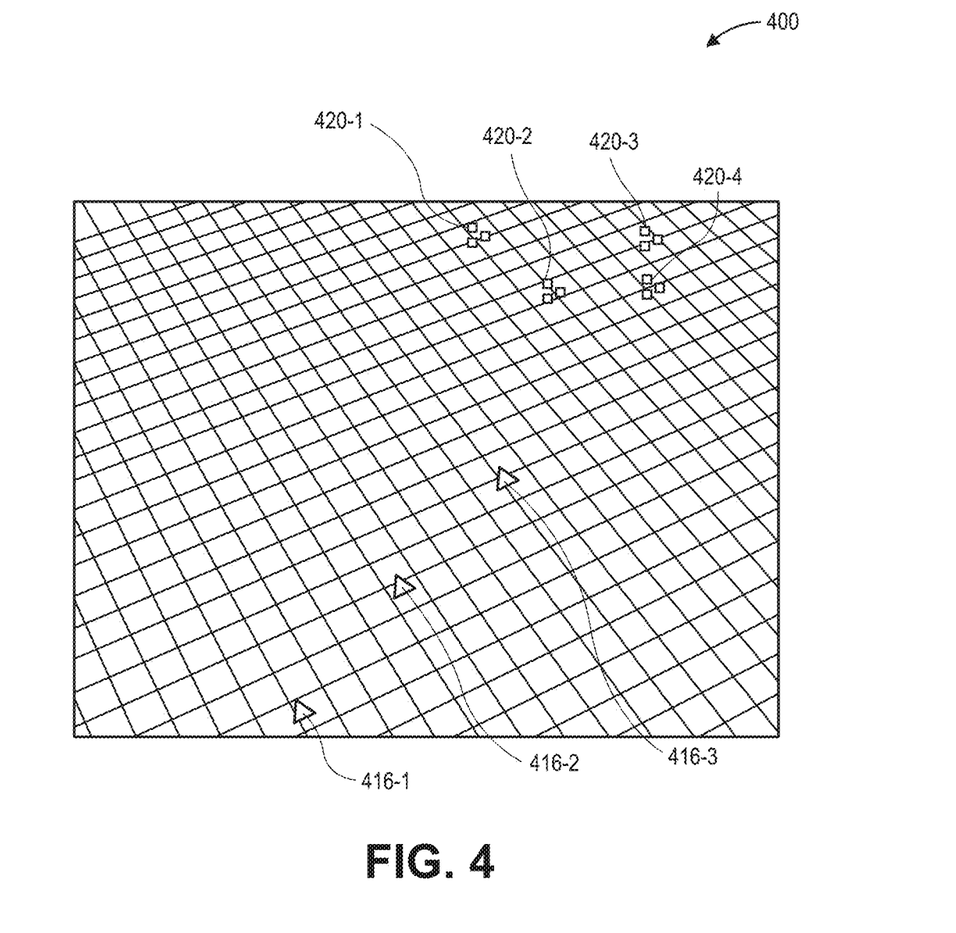
FIG. 4 is a schematic diagram illustrating camera pose estimation, triangulation, and bundle adjustment with respect to bounding boxes and tracked points, in accordance with implementations of the present disclosure.

FIG. 4 is a schematic diagram 400 illustrating camera pose estimation, triangulation, and bundle adjustment with respect to bounding boxes and tracked points, in accordance with implementations of the present disclosure.

As shown in FIG. 4, a plurality of camera pose estimations 416 are illustrated as triangles on a two-dimensional plane. In addition, a plurality of locations 420 of respective bounding boxes and/or tracked points associated with bounding boxes are illustrated as clustered squares on the two-dimensional plane.

In example embodiments, each camera pose estimation 416 may be associated with a single square of the clustered squares at each of the plurality of locations 420 of respective bounding boxes and/or tracked points. For example, camera pose estimation 416-1 may be associated with one square, e.g., an upper left side square, at each of the plurality of locations 420-1, 420-2, 420-3, 420-4 of respective bounding boxes and/or tracked points. In addition, camera pose estimation 416-2 may be associated with one square, e.g., a lower left side square, at each of the plurality of locations 420-1, 420-2, 420-3, 420-4 of respective bounding boxes and/or tracked points. Further, camera pose estimation 416-3 may be associated with one square, e.g., a right side square, at each of the plurality of locations 420-1, 420-2, 420-3, 420-4 of respective bounding boxes and/or tracked points. Further, the plurality of locations 420-1, 420-2, 420-3, 420-4 of respective bounding boxes and/or tracked points may correspond to the plurality of bounding boxes 211-1, 211-2, 211-3, 211-4 illustrated in the example image 201 of FIG. 2. Although not illustrated in the example of FIG. 4, a plurality of points other than points associated with locations 420 of respective bounding boxes, such as a plurality of points dispersed or spread out in the environment and external to any bounding boxes, may also be tracked in order to facilitate camera pose estimation, triangulation, and bundle adjustment as described herein.

Camera pose estimations, e.g., imaging device positions and/or orientations, may be determined based at least in part on identified and tracked points within individual images of an image sequence of an environment. As illustrated in FIG. 4, the identified and tracked points may include points associated with and/or internal to bounding boxes of objects, such as a plurality of points associated with a bounding box 311 itself and/or a plurality of points 312 associated with other portions of the bounding box 311 described with reference to FIG. 3. In addition, the identified and tracked points may include points associated with an environment external to bounding boxes of objects, such as a plurality of points 314 associated with an environment external to bounding box 311 described with reference to FIG. 3. Thus, the camera pose estimations may comprise imaging device positions and/or orientations relative to one or more, or substantially all, identified and tracked points within individual images of the image sequence.

Referring again to FIG. 4, the camera pose estimation 416-1 may be determined based on respective first tracked points associated with each of the plurality of locations 420-1, 420-2, 420-3, 420-4 of respective bounding boxes at a first time, the camera pose estimation 416-2 may be determined based on respective second tracked points associated with each of the plurality of locations 420-1, 420-2, 420-3, 420-4 of respective bounding boxes at a second time, and the camera pose estimation 416-3 may be determined based on respective third tracked points associated with each of the plurality of locations 420-1, 420-2, 420-3, 420-4 of respective bounding boxes at a third time.

Then, using the camera pose estimations, imaging device positions and/or orientations, as well as positions of tracked points, may be determined based at least in part on changes or movements of the identified and tracked points across multiple images of the image sequence. For example, identified and tracked points within multiple images may be compared in order to determine respective imaging device positions and/or orientations for individual ones of the multiple images. As a result, the position and/or orientation of the imaging device, as well as the position of tracked points, may be determined for individual ones of the multiple images of the image sequence, as well as the movement of the imaging device between multiple images of the image sequence.

Referring again to FIG. 4, respective positions and/or orientations of the imaging device, as well as respective positions of tracked points, at each of the camera pose estimations 416-1, 416-2, 416-3 may be determined based at least in part on the changes or movements of identified and tracked points across multiple images For example, a position and/or orientation of the imaging device, as well as the position of tracked points, at camera pose estimation 416-1 may be determined based at least in part on the changes or movements of identified and tracked points between a first image associated with camera pose estimation 416-1 at a first time and a second image associated with camera pose estimation 416-2 at a second time after movement of the imaging device from camera pose estimation 416-1 to camera pose estimation 416-2. In addition, a position and/or orientation of the imaging device, as well as the position of tracked points, at camera pose estimation 416-2 may be determined based at least in part on the changes or movements of identified and tracked points between the first image associated with camera pose estimation 416-1 at the first time and the second image associated with camera pose estimation 416-2 at the second time after movement of the imaging device from camera pose estimation 416-1 to camera pose estimation 416-2, and between the second image associated with camera pose estimation 416-2 at the second time and a third image associated with camera pose estimation 416-3 at a third time after movement of the imaging device from camera pose estimation 416-2 to camera pose estimation 416-3. Further, a position and/or orientation of the imaging device, as well as the position of tracked points, at camera pose estimation 416-3 may be determined based at least in part on the changes or movements of identified and tracked points between the second image associated with camera pose estimation 416-2 at the second time and the third image associated with camera pose estimation 416-3 at the third time after movement of the imaging device from camera pose estimation 416-2 to camera pose estimation 416-3.

Further, the tracked points may be bundled and adjusted based on the determined imaging device positions and/or orientations, the determined positions of tracked points, and the multiple images of the image sequence. For example, as shown in FIG. 4, identified and tracked points associated with multiple images of the image sequence may form clusters of tracked points at a plurality of locations 420 of respective bounding boxes. Individual clusters of tracked points at each location 420 may be bundled, adjusted, or otherwise modified to represent a bounding box or one or more points associated with the bounding box. For example, individual clusters of tracked points may be merged, combined, averaged, or otherwise aggregated to a single bounding box or one or more points associated with the bounding box. In one example, a cluster of tracked points associated with the bounding box may be combined at a geometric center of the cluster of tracked points.

Referring again to FIG. 4, responsive to bundle adjustment with respect to the clusters of identified and tracked points at each of the plurality of locations 420 of respective bounding boxes, the cluster of points at location 420-1 may be aggregated to a single point at location 420-1, the cluster of points at location 420-2 may be aggregated to a single point at location 420-2, the cluster of points at location 420-3 may be aggregated to a single point at location 420-3, and the cluster of points at location 420-4 may be aggregated to a single point at location 420-4.

In this manner, based at least in part on object and point tracking within an image sequence, camera pose estimation for individual images, triangulation of imaging device positions and/or orientations as well as positions of tracked points, and bundle adjustment of tracked points based on the determined imaging device positions and/or orientations, a reconstruction of a three-dimensional model of the environment may be generated. However, the reconstruction of the three-dimensional model may have arbitrary scale and orientation relative to a real-world scale and orientation of the environment.

As further described herein, the reconstruction of the three-dimensional model may then be aligned, scaled, and oriented with actual location data, e.g., GPS data, associated with individual images of the image sequence, as at geo-alignment 123 shown in FIG. 1. In addition, a bounding box associated with an object may be correlated with corresponding points of the three-dimensional model. For example, a cluster of latitude and longitude coordinates of the bounding box associated with the object may be computed based on multiple images of the image sequence, as at 2D-3D correspondence 125 shown in FIG. 1. Furthermore, an actual location of the object may be determined based on a combination of the cluster of latitude and longitude coordinates of the bounding box associated with the object, as at geo-clustering 127 shown in FIG. 1.

Figure 5:
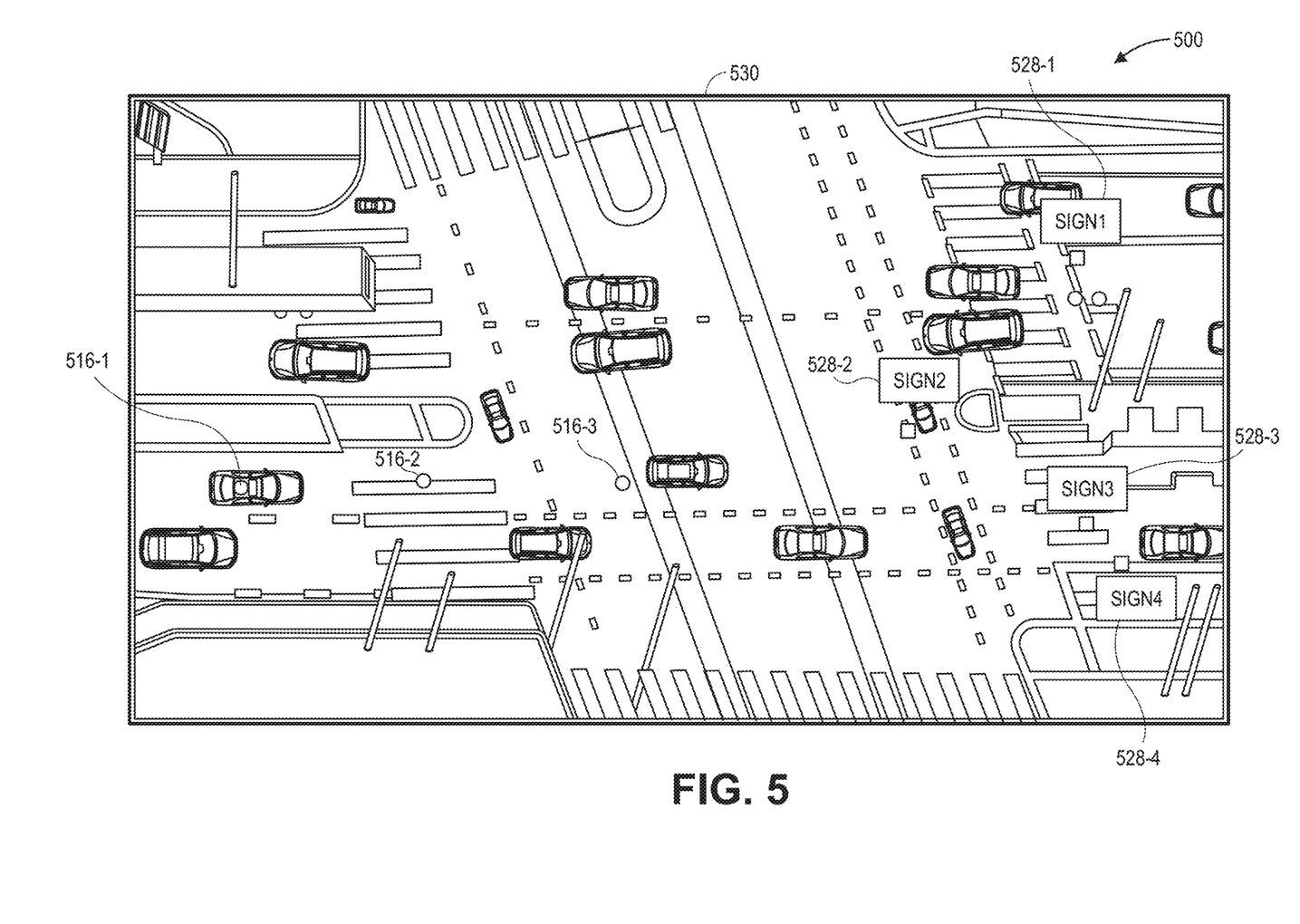
FIG. 5 is a schematic overhead diagram of an example three-dimensional model illustrating geo-alignment, 2D-3D correspondence, and geo-clustering with respect to bounding boxes and tracked points, in accordance with implementations of the present disclosure.

FIG. 5 is a schematic overhead diagram 500 of an example three-dimensional model 530 illustrating geo-alignment, 2D-3D correspondence, and geo-clustering with respect to bounding boxes and tracked points, in accordance with implementations of the present disclosure.

As shown in FIG. 5, a plurality of camera pose estimations 516 are illustrated as circles within a three-dimensional model. In addition, a plurality of geo-referenced locations 528 of respective bounding boxes and/or tracked points associated with bounding boxes are schematically illustrated as traffic signs within the three-dimensional model.

In example embodiments, each camera pose estimation 516-1, 516-2, 516-3 may comprise a respective imaging device position and/or orientation that may be associated with one or more tracked points corresponding to the geo-referenced locations 528 of respective bounding boxes and/or tracked points, in which the one or more tracked points may have been bundled, adjusted, merged, combined, or otherwise aggregated as described herein. Further, the plurality of geo-referenced locations 528-1, 528-2, 528-3, 528-4 of respective bounding boxes may correspond to the plurality of locations 420-1, 420-2, 420-3, 420-4 of respective bounding boxes and/or tracked points illustrated in the example diagram of FIG. 4, as well as the plurality of bounding boxes 211-1, 211-2, 211-3, 211-4 illustrated in the example image 201 of FIG. 2.

A reconstruction of a three-dimensional model of an environment, e.g., generated using a structure from motion algorithm or using a direct triangulation algorithm as described herein, may be aligned, scaled, and oriented with actual location data, e.g., GPS location data 121, associated with individual images of the image sequence. For example, during capture of the image sequence 101 by an imaging device of a vehicle, a location sensor associated with a vehicle may also receive or capture location data 121 associated with individual images of the image sequence. As described herein, the imaging device and the location sensor onboard the vehicle may have accurate time synchronization therebetween, such that imaging data captured by the imaging device may be correlated accurately in time with location data captured by the location sensor. Based at least in part on the location data 121 associated with individual images of the image sequence 101, the reconstruction of the three-dimensional model of the environment may be aligned, scaled, and oriented to correspond to the real-world environment. For example, a first image having associated first location data may be aligned, scaled, and oriented to a first real-world location, a second image having associated second location data may be aligned, scaled, and oriented to a second real-world location, and so on. In this manner, individual images of the image sequence, and consequently, the plurality of identified and tracked points within the multiple images of the image sequence, may be aligned, scaled, and oriented to correspond to the real-world environment.

Referring again to FIG. 5, each camera pose estimation 516-1, 516-2, 516-3 may be aligned, scaled, and oriented to a respective actual location relative to a real-world environment based at least in part on location data associated with individual images at each camera pose estimation 516-1, 516-2, 516-3. In addition, the triangulated positions and/or orientations of the imaging device, as well as the triangulated positions of tracked points, may result in alignment, scaling, and orientation of identified, tracked, and bundled points associated with individual images at each camera pose estimation 516-1, 516-2, 516-3, e.g., at positions and/or orientations generally corresponding to the geo-referenced locations 528-1, 528-2, 528-3, 528-4.

Then, a bounding box associated with an object may be correlated with corresponding points of the three-dimensional model. For example, based at least in part on the reconstruction of the three-dimensional model that is aligned, scaled, and oriented with the real-world environment, which may include positions and/or orientations of the imaging device and positions and/or orientations of identified, tracked, and bundled points, actual locations of one or more tracked points associated with a bounding box of an object may be calculated. In example embodiments, the actual locations of the one or more tracked points may comprise latitude and longitude coordinates relative to the real-world environment. In examples in which a plurality of points may be identified and tracked with respect to a single bounding box associated with an object, the plurality of points may form a cluster at respective actual locations having similar latitude and longitude coordinates.

Referring again to FIG. 5, each geo-referenced location 528-1, 528-2, 528-3, 528-4 may represent an actual location of a respective traffic sign based at least in part on the reconstruction of the three-dimensional model that is aligned, scaled, and oriented with the real-world environment. In addition, each geo-referenced location 528-1, 528-2, 528-3, 528-4 may comprise one or more tracked points associated with a respective traffic sign. Further, each geo-referenced location 528-1, 528-2, 528-3, 528-4 may comprise one or more, e.g., a cluster of, points having latitude and longitude coordinates relative to the real-world environment.

Further, an actual location of an object to be localized may be determined based on a combination of a cluster of points having similar latitude and longitude coordinates that are associated with a bounding box of the object. In example embodiments, the cluster of points associated with the bounding box of the object may be combined, merged, averaged, or otherwise aggregated to a single actual location for the object using various methods. In one example, a cluster of points may be combined at a single actual location having latitude and longitude coordinates at a geometric center of the cluster. In another example, a cluster of points may be combined at a single actual location having latitude and longitude coordinates based on a mean, median, or mode of the plurality of locations of the cluster of points. In further examples, locations of points among the cluster having latitude and longitude coordinates that are outliers may be discarded, removed, or ignored, e.g., if the latitude and longitude coordinates are larger than a threshold distance from one or more other locations of points among the cluster.

Referring again to FIG. 5, each geo-referenced location 528-1, 528-2, 528-3, 528-4 may represent an actual location of a respective traffic sign based at least in part on the reconstruction of the three-dimensional model that is aligned, scaled, and oriented with the real-world environment. In addition, each geo-referenced location 528-1, 528-2, 528-3, 528-4 may represent a combination, merging, averaging, or other aggregation of a cluster of tracked points associated with a respective traffic sign. Further, each geo-referenced location 528-1, 528-2, 528-3, 528-4 may comprise latitude and longitude coordinates for a single combined, merged, averaged, or otherwise aggregated actual location of a respective traffic sign relative to the real-world environment.

In some example embodiments, inaccuracies, errors, and/or asynchronization with respect to imaging data and/or location data may result in misalignment, shifting, or other errors in the final geo-referenced locations 528-1, 528-2, 528-3, 528-4 of objects. Various algorithms or processes, e.g., e.g., one or more manual or automated ground truth determination and/or error correction processes or techniques, may be utilized to adjust, modify, or remove such misalignment or errors. In some example embodiments, manual processes may be used to determine ground truth locations associated with respective objects, e.g., manually annotated latitude and longitude coordinates based on various types of imaging data, such as onboard camera images, satellite imagery, street view images, and/or others. In other example embodiments, automated processes may be used to determine ground truth locations associated with respective objects, e.g., automatically determined latitude and longitude coordinates using radar sensors, LIDAR sensors, stereo imaging sensors, and/or others. The ground truth locations, whether determined using manual or automated processes, may be used to correct, calibrate, and/or refine the determination of final geo-referenced locations of objects.

In this manner, one or more objects, such as traffic signs, traffic lights, street signs, building or house numbers, or other objects, may be accurately and reliably localized for mapping applications. By using a combination of structure from motion algorithms and/or direct triangulation algorithms, the systems and methods described herein may leverage advantages of various types of algorithms. Although more expensive, slower, and more computationally intensive and generally requiring remote servers or processors, structure from motion algorithms may nonetheless provide accurate reconstructions of three-dimensional models of environments. In addition, reconstructions based on structure from motion algorithms may be used for visualization, debugging, and/or validation of reconstructions using other faster and less computationally intensive algorithms. Direct triangulation algorithms as described herein may be less expensive, faster, and less computationally intensive and may generally enable processing by edge processors or other processors onboard vehicles. Thus, the direct triangulation algorithms described herein may generate and/or process reconstructions of three-dimensional models of environments directly onboard vehicles, such that the vehicles may both receive or capture data, e.g., image sequences, bounding boxes, and location data, and also process, calculate, reconstruct, and utilize the data to localize objects within the environment substantially in real-time.

In other example embodiments, one or more processors onboard a vehicle, potentially in combination with one or more remote servers or processors, may instruct, perform, or utilize structure from motion algorithms and direct triangulation algorithms substantially in parallel, instead of the exemplary serial process illustrated in FIG. 1. Furthermore, depending on the processing capabilities of one or more processors onboard a vehicle, both structure from motion algorithms and direct triangulation algorithms may be performed by such processors onboard the vehicle, instead of instructing or utilizing one or more remote servers or processors separate from and in communication with the processors onboard the vehicle.

In further example embodiments, in addition to localizing objects within an environment using the systems and methods described herein, self-localization or visual localization of vehicles may also be enabled based on reconstructions of three-dimensional models of environments. For example, responsive to determining that a reconstruction of a three-dimensional model of an environment that is being generated by an onboard processor of a vehicle corresponds to a previously generated and stored reconstruction of a three-dimensional model of the same environment, the vehicle may be localized within the environment relative to various identified and tracked points and/or objects of the three-dimensional model of the environment, including one or more objects that have previously been localized within the environment.

In still further example embodiments, in combination with algorithms, processes, or techniques to generate semantic understanding of objects such as traffic signs, traffic lights, street signs, or other objects, various guidance, alerts, instructions, commands, or other outputs may be provided based on localization of objects within an environment. For example, guidance or alerts may be provided to drivers and/or passengers of vehicles based on accurate localization and semantic understanding of traffic signs. In addition, instructions or commands may be transmitted to vehicles, e.g., autonomously operated or at least partially manually operated vehicles, based on accurate localization and semantic understanding of traffic signs on a roadway. The combination of accurate localization of objects and semantic understanding of localized objects may increase or improve safety, efficiency, and reliability of operations of various vehicles, equipment, or other systems within various types of environments.

Moreover, although the description herein generally relates to localization of objects within particular types of environments, such as roadways, streets, or other outdoor environments, the systems and methods described herein may also be applied to localization of objects with respect to other types of environments, such as indoor environments including warehouses, manufacturing facilities, wholesale or retail environments, or other indoor environments, water-based environments, aerial or airborne environments, and/or outer space or celestial environments.

Figure 6:
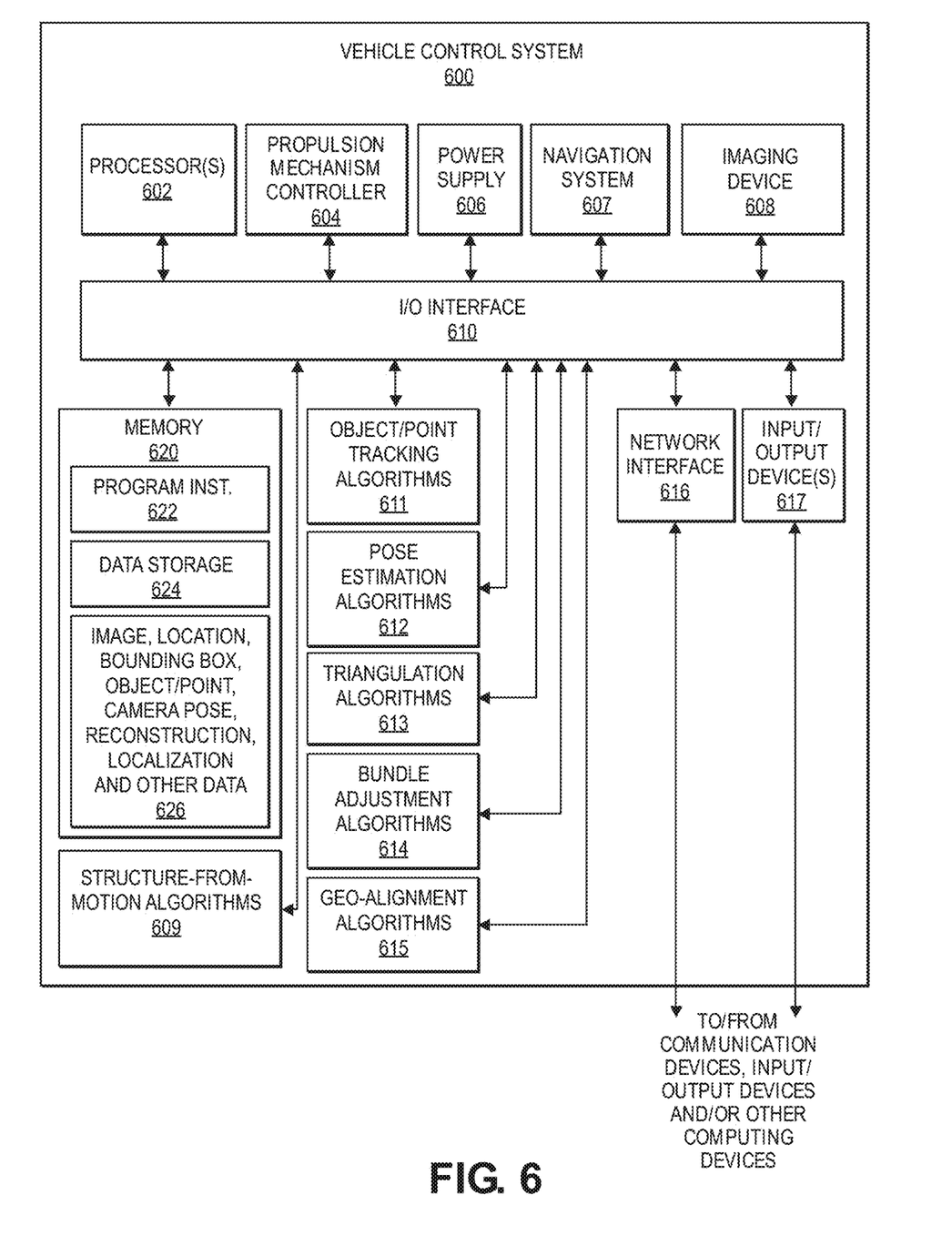
FIG. 6 is a block diagram illustrating various components of a vehicle control system, in accordance with implementations of the present disclosure.

FIG. 6 is a block diagram illustrating various components of a vehicle control system 600, in accordance with implementations of the present disclosure.

In various examples, the block diagram may be illustrative of one or more aspects of the vehicle control system 600 that may be used to implement the various systems and processes discussed above. In the illustrated implementation, the vehicle control system 600 includes one or more processors 602, coupled to a non-transitory computer readable storage medium 620 via an input/output (I/O) interface 610. The vehicle control system 600 may also include a propulsion mechanism controller 604, a power source, supply, or battery 606, a navigation system 607, and an imaging device 608. The vehicle control system 600 may further include various algorithms or techniques described herein, such as structure from motion algorithms 609, object and point tracking algorithms 611, pose estimation algorithms 612, triangulation algorithms 613, bundle adjustment algorithms 614, and/or geo-alignment algorithms 615, as well as a network interface 616, and one or more input/output devices 617.

In various implementations, the vehicle control system 600 may be a uniprocessor system including one processor 602, or a multiprocessor system including several processors 602 (e.g., two, four, eight, or another suitable number). The processor(s) 602 may be any suitable processor capable of executing instructions. For example, in various implementations, the processor(s) 602 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 602 may commonly, but not necessarily, implement the same ISA.

The non-transitory computer readable storage medium 620 may be configured to store executable instructions, data, and various other data, including image data, location data, bounding box data, object and point data, camera pose data, reconstruction data, localization data, and/or other data items accessible by the processor(s) 602. In various implementations, the non-transitory computer readable storage medium 620 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable storage medium 620 as program instructions 622, data storage 624 and various other data 626, respectively. In other implementations, program instructions, data and/or various other data may be received, sent or stored upon different types of computer-accessible media, such as non-transitory media, or on similar media separate from the non-transitory computer readable storage medium 620 or the vehicle control system 600.

Generally, a non-transitory, computer readable storage medium may include storage media or memory media such as magnetic or optical media, e.g., disk or CD/DVD-ROM, coupled to the vehicle control system 600 via the I/O interface 610. Program instructions and data stored via a non-transitory computer readable medium may be transmitted by transmission media or signals, such as electrical, electromagnetic, or digital signals, which may be conveyed via a communication medium such as a network and/or a wireless link, such as may be implemented via the network interface 616.

In one implementation, the I/O interface 610 may be configured to coordinate I/O traffic between the processor(s) 602, the non-transitory computer readable storage medium 620, and any peripheral devices, the network interface 616 or other peripheral interfaces, such as input/output devices 617. In some implementations, the I/O interface 610 may perform any necessary protocol, timing or other data transformations to convert data signals from one component (e.g., non-transitory computer readable storage medium 620) into a format suitable for use by another component (e.g., processor(s) 602). In some implementations, the I/O interface 610 may include support for devices attached through various types of peripheral buses, such as a variant of the Peripheral Component Interconnect (PCI) bus standard or the Universal Serial Bus (USB) standard, for example. In some implementations, the function of the I/O interface 610 may be split into two or more separate components, such as a north bridge and a south bridge, for example. Also, in some implementations, some or all of the functionality of the I/O interface 610, such as an interface to the non-transitory computer readable storage medium 620, may be incorporated directly into the processor(s) 602.

The propulsion mechanism controller 604 may communicate with the navigation system 607 and may adjust or control the operational characteristics of one or more engines, motors, or other propulsion mechanisms to navigate the vehicle along a determined path and/or to perform other navigational maneuvers. The navigation system 607 may include a GPS sensor, GNSS sensor, location sensor, and/or other similar sensor or system than can be used to receive or capture location data and to navigate the vehicle to and/or from a location.

The imaging device 608 may include a monocular camera, a stereo camera, a depth sensor, and/or other types of imaging devices that can be used to receive or capture imaging data or image sequences of an environment and objects within an environment during operation or navigation of the vehicle.

The vehicle control system 600 may also include various algorithms or techniques described herein, such as structure from motion algorithms 609, object and point tracking algorithms 611, pose estimation algorithms 612, triangulation algorithms 613, bundle adjustment algorithms 614, and/or geo-alignment algorithms 615. For example, the structure from motion algorithms 609 may perform various processes and functions described at least with respect to FIG. 1, the object and point tracking algorithms 611 may perform various processes and functions described at least with respect to FIGS. 1-3, the pose estimation algorithms 612 may perform various processes and functions described at least with respect to FIGS. 1-4, the triangulation algorithms 613 may perform various processes and functions described at least with respect to FIGS. 1-4, the bundle adjustment algorithms 614 may perform various processes and functions described at least with respect to FIGS. 1-4, and the geo-alignment algorithms 615 may perform various processes and functions described at least with respect to FIGS. 1-5.

The network interface 616 may be configured to allow data to be exchanged between the vehicle control system 600, other devices attached to a network, such as other computer systems, imaging sensors, location sensors, and/or control systems of other vehicles, systems, machines, equipment, apparatuses, systems, or devices. For example, the network interface 616 may enable wireless communication between numerous vehicles. In various implementations, the network interface 616 may support communication via wireless general data networks, such as a Wi-Fi network. For example, the network interface 616 may support communication via telecommunications networks such as cellular communication networks, satellite networks, and the like.

Input/output devices 617 may, in some implementations, include one or more displays, imaging sensors, image capture devices, location sensors, thermal sensors, infrared sensors, time of flight sensors, accelerometers, pressure sensors, weather sensors, various other sensors described herein, etc. Multiple input/output devices 617 may be present and controlled by the vehicle control system 600. One or more of these sensors may be utilized to assist in performing the various functions, operations, and processes described herein.

As shown in FIG. 6, the memory may include program instructions 622 which may be configured to implement the example processes and/or sub-processes described above. The data storage 624 may include various data stores for maintaining data items that may be provided for performing the various functions, operations, and processes described herein. For example, the data storage 624 and/or the various other data 626 may include image data, location data, bounding box data, object and point data, camera pose data, reconstruction data, localization data, and/or other data items.

Those skilled in the art will appreciate that the vehicle control system 600 is merely illustrative and is not intended to limit the scope of the present disclosure. In particular, the computing system and devices may include any combination of hardware or software that can perform the indicated functions, including other control systems or controllers, computers, network devices, internet appliances, PDAs, wireless phones, pagers, etc. The vehicle control system 600 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

While the above examples have been described with respect to vehicles, the disclosed implementations may also be used for various other forms of vehicles or mobile systems, including, but not limited to, ground based vehicles, water based vehicles, unmanned vehicles, autonomous guided vehicles (AGVs), material handling equipment, machinery, or apparatus, carts, bicycles and cyclists, pedestrians, or others.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the schematic architecture diagram shown in FIG. 1, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An object localization system onboard a vehicle, comprising:
    a monocular imaging device;
    a global positioning system (GPS) sensor; and
    a processor configured to at least:
        receive, from the monocular imaging device, imaging data associated with an environment;
        instruct reconstruction of the environment using a structure from motion algorithm;
        determine that reconstruction of the environment using the structure from motion algorithm was unsuccessful; and
        responsive to determining that the reconstruction of the environment using the structure from motion algorithm was unsuccessful:
            receive bounding box data associated with a traffic sign within the environment;
            track, over a plurality of images of the imaging data, a first plurality of points associated with the traffic sign;
            track, over the plurality of images of the imaging data, a second plurality of points associated with the environment around the traffic sign;
            estimate, for individual images of the imaging data, a respective position of the imaging device based at least in part on the first plurality of points and the second plurality of points;
            triangulate, over a plurality of images of the imaging data, respective positions of the imaging device with respect to the first plurality of points and the second plurality of points;
            bundle, for individual images of the imaging data, the first plurality of points and the second plurality of points based at least in part on the respective positions of the imaging device;
            align, based on data from the GPS sensor, the plurality of images of the imaging data with actual locations within a real-world environment;
            correlate the first plurality of points and the second plurality of points to respective actual locations within the real-world environment based at least in part on the triangulated respective positions of the imaging device; and
            cluster the first plurality of points associated with the traffic sign at a respective actual location within the real-world environment.

2. The object localization system of claim 1, wherein the structure from motion algorithm is performed by a remote server, the remote server being separate from and in communication with the processor onboard the vehicle;
    wherein instructing reconstruction of the environment using the structure from motion algorithm further comprises transmitting, by the processor, the imaging data to the remote server; and
    wherein determining that reconstruction of the environment using the structure from motion algorithm was unsuccessful further comprises receiving, by the processor from the remote server, a determination that the reconstruction using the structure from motion algorithm was unsuccessful.

3. The object localization system of claim 1, wherein the first plurality of points associated with the traffic sign comprise at least one of:
    at least one point along an edge of a bounding box associated with the traffic sign, or
    at least one point within the bounding box associated with the traffic sign.

4. The object localization system of claim 3, wherein the bounding box is tracked using an object tracking and feature matching algorithm including at least one of channel and spatial reliability tracking (CSRT), kernelized correlation filter (KCF), or median flow; or
    wherein the first plurality of points are tracked using an optical flow algorithm.

5. The object localization system of claim 1, wherein the second plurality of points associated with the environment around the traffic sign comprise at least one point external to a bounding box associated with the traffic sign.

6. The object localization system of claim 5, wherein the second plurality of points are tracked using an optical flow algorithm.

7. A computer-implemented method, comprising:
- receiving, by a processor from an imaging device, imaging data associated with an environment;
- instructing, by the processor, reconstruction of the environment using a structure from motion algorithm;
- determining, by the processor, that reconstruction of the environment using the structure from motion algorithm was unsuccessful;
- receiving, by the processor, bounding box data associated with an object within the environment;
- tracking, by the processor over a plurality of images of the imaging data, a first point associated with the object;
- estimating, by the processor for individual images of the imaging data, a respective position of the imaging device based at least in part on the first point;
- triangulating, by the processor over a plurality of images of the imaging data, respective positions of the imaging device with respect to the first point;
- aligning, by the processor based on data from a location sensor, the plurality of images of the imaging data with actual locations within a real-world environment; and
- correlating, by the processor, the first point to a respective first actual location within the real-world environment based at least in part on the triangulated respective positions of the imaging device.

8. The computer-implemented method of claim 7, wherein the first point comprises a first plurality of points associated with the object; and
the method further comprising:
- bundling, by the processor for individual images of the imaging data, the first plurality of points based at least in part on the respective positions of the imaging device; and
- clustering the first plurality of points associated with the object at the respective first actual location within the real-world environment.

9. The computer-implemented method of claim 8, wherein the first plurality of points associated with the object comprise at least one of:
- at least one point along an edge of a bounding box associated with the object, or
- at least one point within the bounding box associated with the object.

10. The computer-implemented method of claim 9, wherein the bounding box is tracked using an object tracking and feature matching algorithm including at least one of channel and spatial reliability tracking (CSRT), kernelized correlation filter (KCF), or median flow; or
wherein the first plurality of points are tracked using an optical flow algorithm.

11. The computer-implemented method of claim 7, further comprising:
- tracking, by the processor over the plurality of images of the imaging data, a second point associated with the environment around the object;
- estimating, by the processor for individual images of the imaging data, a respective position of the imaging device further based at least in part on the second point;
- triangulating, by the processor over the plurality of images of the imaging data, respective positions of the imaging device further with respect to the second point; and
- correlating, by the processor, the second point to a respective second actual location within the real-world environment based at least in part on the triangulated respective positions of the imaging device.

12. The computer-implemented method of claim 11, wherein the second point comprises a second plurality of points associated with the environment around the object; and
the method further comprising:
- bundling, by the processor for individual images of the imaging data, the second plurality of points based at least in part on the respective positions of the imaging device; and
- clustering the second plurality of points associated with the environment around the object at the respective second actual location within the real-world environment.

13. The computer-implemented method of claim 12, wherein the second plurality of points associated with the environment around the object comprise at least one point external to a bounding box associated with the object.

14. The computer-implemented method of claim 13, wherein the second plurality of points are tracked using an optical flow algorithm.

15. The computer-implemented method of claim 7, wherein the processor, the imaging device, and the location sensor are onboard a vehicle; and
wherein the structure from motion algorithm is performed by at least one of the processor onboard the vehicle or a remote server, the remote server being separate from and in communication with the processor onboard the vehicle.

16. The computer-implemented method of claim 7, wherein the object comprises at least one of a traffic sign, a traffic light, a street sign, a building sign, or a house number.

17. A method to localize an object, comprising:
- receiving, by a processor from an imaging device, imaging data associated with an environment;
- instructing, by the processor, reconstruction of the environment using a structure from motion algorithm;
- determining, by the processor, that reconstruction of the environment using the structure from motion algorithm was unsuccessful;
- receiving, by the processor, bounding box data associated with an object within the environment;
- tracking, by the processor over a plurality of images of the imaging data, a first point associated with a bounding box of the object using at least one of an object tracking and feature matching algorithm or an optical flow algorithm;
- tracking, by the processor over the plurality of images of the imaging data, a second point associated with the environment around the object using an optical flow algorithm;
- estimating, by the processor for individual images of the imaging data, a respective position of the imaging device based at least in part on the first point and the second point;
- triangulating, by the processor over a plurality of images of the imaging data, respective positions of the imaging device with respect to the first point and the second point;
- aligning, by the processor based on data from a location sensor, the plurality of images of the imaging data with actual locations within a real-world environment; and
- correlating, by the processor, the first point and the second point to respective actual locations within the real-world environment based at least in part on the triangulated respective positions of the imaging device.

18. The method of claim 17, wherein the first point comprises a first plurality of points associated with the bounding box of the object; and wherein the second point comprises a second plurality of points associated with the environment around the object;

the method further comprising:

bundling, by the processor for individual images of the imaging data, the first plurality of points and the second plurality of points based at least in part on the respective positions of the imaging device; and clustering the first plurality of points associated with the object and the second plurality of points associated with the environment at respective actual locations within the real-world environment.

19. The method of claim 17, wherein the first point associated with the bounding box of the object comprises a first plurality of points including at least one point at a corner or along an edge of the bounding box associated with the object; and wherein the object tracking and feature matching algorithm includes at least one of channel and spatial reliability tracking (CSRT), kernelized correlation filter (KCF), or median flow.

\* \* \* \* \*